(12) United States Patent
Bayraktar et al.

(10) Patent No.: US 12,241,338 B2
(45) Date of Patent: Mar. 4, 2025

(54) GEOLOGICAL ANALOG RECOMMENDATION WORKFLOW USING REPRESENTATIVE EMBEDDINGS

(71) Applicant: Schlumberger Technology Corporation, Sugar Land, TX (US)

(72) Inventors: Zikri Bayraktar, Wilmington, MA (US); Hedi Driss, Boston, MA (US); Marie Emeline Cecile LeFranc, Jar (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 252 days.

(21) Appl. No.: 17/753,598

(22) PCT Filed: Sep. 9, 2020

(86) PCT No.: PCT/US2020/049963
§ 371 (c)(1),
(2) Date: Mar. 9, 2022

(87) PCT Pub. No.: WO2021/050562
PCT Pub. Date: Mar. 18, 2021

(65) Prior Publication Data
US 2022/0341292 A1  Oct. 27, 2022

Related U.S. Application Data

(60) Provisional application No. 62/897,640, filed on Sep. 9, 2019.

(51) Int. Cl.
*E21B 41/00* (2006.01)
*G01V 20/00* (2024.01)
*G06F 40/279* (2020.01)

(52) U.S. Cl.
CPC .............. *E21B 41/00* (2013.01); *G01V 20/00* (2024.01); *G06F 40/279* (2020.01); *E21B 2200/22* (2020.05)

(58) Field of Classification Search
CPC ..... E21B 41/00; E21B 2200/22; G01V 20/00; G01V 2210/66; G06F 40/279
See application file for complete search history.

(56) References Cited

U.S. PATENT DOCUMENTS

2004/0257240 A1  12/2004  Chen et al.
2013/0341093 A1*  12/2013  Jardine ..................... E21B 7/00
                                            703/2

(Continued)

FOREIGN PATENT DOCUMENTS

WO  2018067131 A1  4/2018

OTHER PUBLICATIONS

T. Mikolov, K. Chen, G. Corrado, J. Dean, "Efficient Estimation of Word Representations in Vector Space," Sep. 7, 2013 (12 pages).

(Continued)

*Primary Examiner* — Hai Phan
*Assistant Examiner* — Ian Scott McLean
(74) *Attorney, Agent, or Firm* — Jeffrey D. Frantz

(57) ABSTRACT

Aspects of the present disclosure relate to a well analog recommendation system. The well analog recommendation system may generate numerical representations indicative of text-based descriptions within a well report and/or well log associated with a well. Further, the well analog recommendation system may generate a well analog output that may include one or more text-based characterizations associated with one or more additional wells that are determined based on the numerical representation. For example, the well analog recommendation system may compare the numerical representation of the well to one or more numerical repre- (Continued)

sentations associated with the one or more additional wells and output the one or more text-based characterizations when the numerical representations are approximately equal or above a threshold.

20 Claims, 9 Drawing Sheets

(56) References Cited

U.S. PATENT DOCUMENTS

| | | | | |
|---|---|---|---|---|
| 2014/0116776 | A1* | 5/2014 | Marx | E21B 12/02 706/11 |
| 2017/0075872 | A1* | 3/2017 | Tong | E21B 47/00 |
| 2018/0232342 | A1* | 8/2018 | Tong | G06N 3/045 |
| 2018/0240021 | A1 | 8/2018 | Al-Harbi et al. | |
| 2019/0286934 | A1* | 9/2019 | Lai | G06T 7/11 |
| 2021/0334433 | A1* | 10/2021 | Taieb | G01V 20/00 |

OTHER PUBLICATIONS

T. Mikolov, I. Sutskever, K. Chen, G. Corrado, J. Dean, "Distributed Representations of Words and Phrases and their Compositionality," NIPS13 Proceedings of the 26th International Conference on Neural Information Processing Systems—vol. 2, Oct. 16, 2013, pp. 3111-3119.

J. Pennington, R. Socher, and C. D. Manning. 2014. "GloVe: Global Vectors for Word Representation". (12 pages).

P. Bojanowski, E. Grave, A. Joulin, T. Mikolov, "Enriching Word Vectors with Subword Information", Transactions of the Association for Computational Linguistics, vol. 5, 2017, p. 135-146.

M. E. Peters, M. Neumann, M. Iyyer, M. Gardner, C. Clark, K. Lee, L. Zettlemoyer, Deep contextualized word representations, Proccedings of NAACL, 2018, New Orleans, Louisiana, Jun. 1-6, 2018, pp. 2227-2237.

J. Howard, S. Ruder. "Universal Language Model Fine-tuning for Text Classification," May 23, 2018 (12 pages).

A. Radford, K. Narasimhan, T. Salimans, and I. Sutskever. Improving language understanding with unsupervised learning. Technical report, OpenAI. Jun. 11, 2018 (17 pages).

J.Devlin, M. Chang, K. Lee and K. Toutanova, BERT: Pre-training of Deep Bidirectional Transformers for Language Understanding, Proceedings of NAACL-HLT 2019, Minneapolis, Minnesota, Jun. 2-Jun. 7, 2019, pp. 4171-4418.

M. Grbovic, H. Cheng, "Real-time Personalization using Embeddings for Search Ranking at Airbnb,", Applied Data Science Track paper, KDD 2018, Aug. 19-23, 2018, London, United Kingdom (10 pages).

J. Wang, P. Huang, H. Zuan, Z. Zhang, B. Zhao, D. L. Lee, "Billion-scale commodity embedding for e-commerce recommendation in Alibaba," May 24, 2018 (10 pages).

Ramzi Karam, Using Word2vec for Music Recommendations, https://towardsdatascience.com/using-word2vec-for-music-recommendations-bb9649ac2484, Dec. 7, 2017 (17 pages).

D. Cer, Y. Yang, S. Kong, N. Hua, N. Limtiaco, R. St. John, N. Constant, M. G.-Cespedes, S. Yuan, C. Tar, Y-H. Sung, B. Strope, R. Kurzweil, "Universal Sentence Encoder", Apr. 12, 2018 (7 pages).

Nitish Srivastrava, Elman Mansimov, Ruslan Salakhutdinov, "Unsupervised Learning of Video Representations using LSTMs", Proceedings of the 32nd International Conference on Machine Learning, Lille, France, 2015 (10 pages).

Naveen Sai Madiraju, Seid M. Sadat, Dimitry Fisher Homa Karimabadi, "Deep temporal clustering: Fully unsupervised earning of time-domain features", Feb. 4, 2018 (11 pages).

Mark Palatucci, Dean Pomerleau, Geoffrey Hinton, Tom M. Mitchell, "Zero-Shot Learning with Semantic Output Codes" https://www.cs.cmu.edu/afs/cs/project/theo-73/www/papers/zero-shot-learning.pdf, 2009 (9 pages).

Richard Socher, Milind Ganjoo, Hamsa Sridhar, Osbert Bastani, Christopher D. Manning, Andrew Y. Ng, "Zero-Shot earning Through Cross-Modal Transfer", 2013 (10 pages).

International Search Report and Written Opinion issued in PCT Application PCT/US2020/049963, dated Nov. 30, 2020 (12 pages).

Ian Goodfellow and Yoshua Bengio and Aaron Courville, "Deep Learning", https://www.deeplearningbook.org/, Chapter 15—Representation Learning, pp. 524-554, (48 pages).

International Preliminary Report on Patentability issued in PCT Application PCT/US2020/049963, dated Mar. 17, 2022 (9 pages).

* cited by examiner

GEOLOGICAL ANALOG RECOMMENDATION WORKFLOW USING REPRESENTATIVE EMBEDDINGS

CROSS-REFERENCES TO RELATED APPLICATIONS

This application is the National Stage Entry of International Application No. PCT/US2020/049963, filed Sep. 9, 2020, which is based on and claims priority to U.S. Provisional Application Ser. No. 62/897,640, filed Sep. 9, 2019, which is incorporated herein by reference in its entirety.

BACKGROUND

The present disclosure relates to systems and methods for discovering and recommending well and geological analogs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The downhole well-logging tools may generate multiple complementary measurements that may be used to infer properties or characteristics of the geological formation surrounding the wellbore. Each of the multiple measurements are represented as well logs, which an operator or analyst can use to make decisions regarding hydrocarbon deposits (e.g., where to drill) and/or potential subsurface areas to avoid. As the volume of information from well logs increases, however, it may be increasingly challenging to identify certain information useful for decisions involved in oil and gas production or exploration.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure is directed to a method. The method includes receiving a text-based characterization of well, wherein the text-based characterization of the well comprises a geological characterization of the well, a petrophysical characterization of the well, or both. The method also includes generating a vector representation of the text-based characterization of well based on the geological characterization, the petrophysical characterization, or both. Further, the method includes identifying one or more analog wells using the vector representation. Further still, the method includes outputting an updated characterization of the well based on the one or more analog wells.

Another embodiment of the present disclosure is directed to a method. The method includes receiving a plurality of well logs, a plurality of well reports, or both, associated with a plurality of wellsites. The method also includes identifying one or more well features from the plurality of well logs, the plurality of well reports, or both. Further, the method includes determining a numerical representation of each well based on the one or more identified well features. Further still, the method includes generating a geological analog recommendation model using the numerical representation of each well.

Another embodiment of the present disclosure is directed to a system. The system includes one or more processors and one or more memory devices storing machine-executable instructions that, when executed by the one or more processors, cause the one or more processors to receive text-based characterization of well, wherein the text-based characterization of the well comprises a geological characterization of the well, a petrophysical characterization of the well, or both; generate vector representation of the text-based characterization of well based on the geological characterization, the petrophysical characterization, or both; and generate a well analog output comprising a well report.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF CHARACTERIZATION OF THE DRAWINGS

Various aspects of this disclosure may be better understood upon reading the following detailed characterization and upon reference to the drawings in which.

Figure 8:
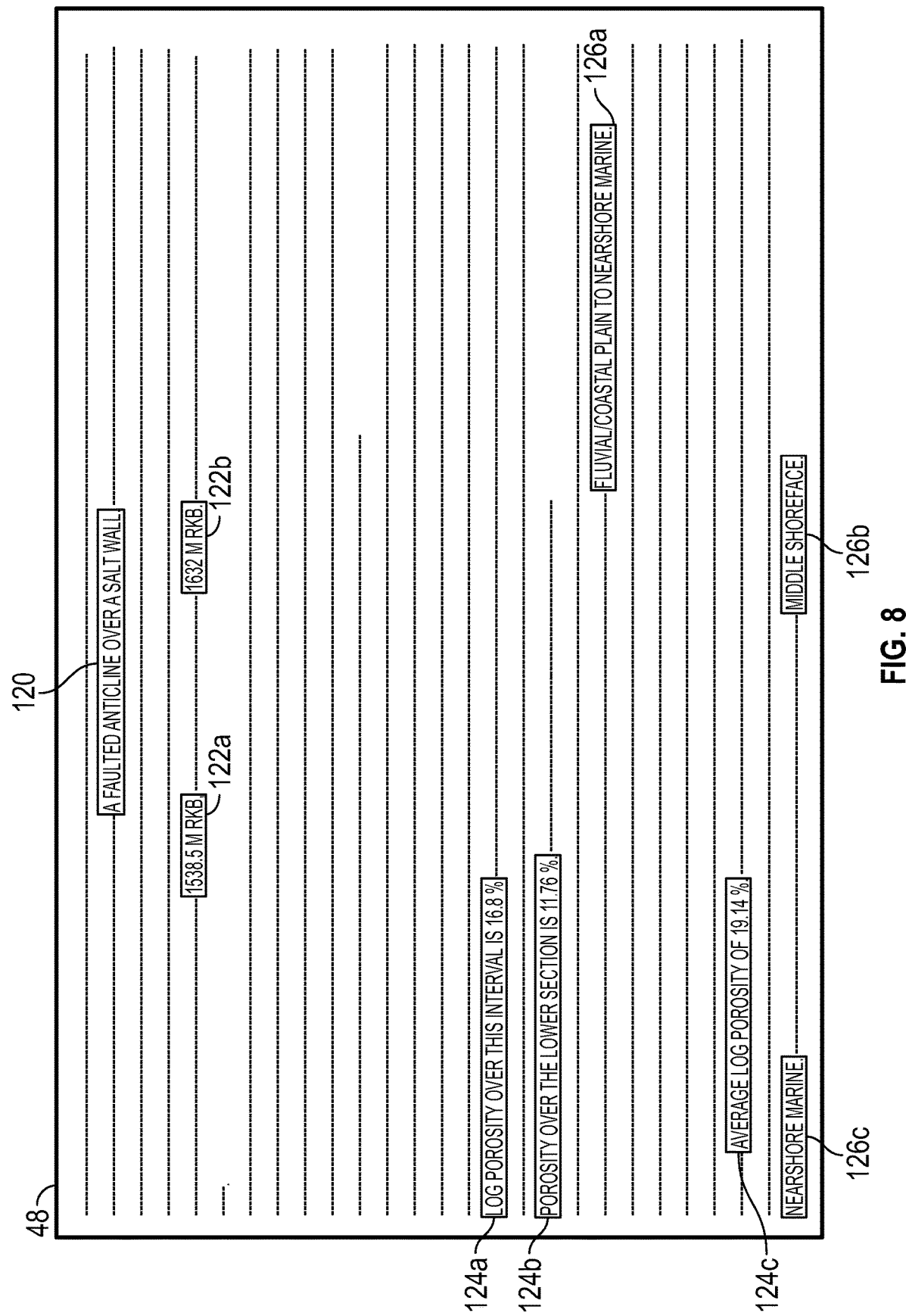
Figure 9:
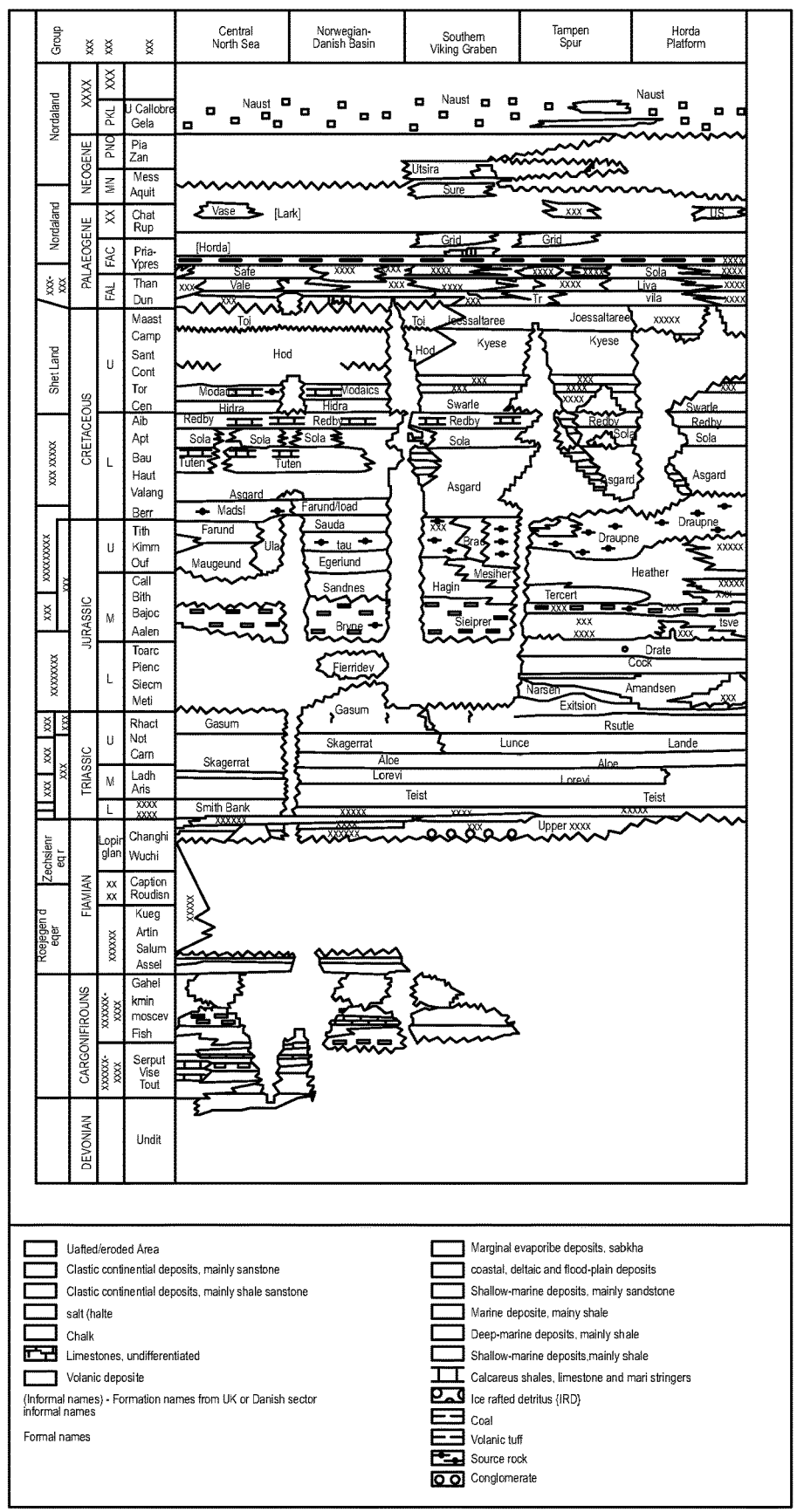
Figure 10:
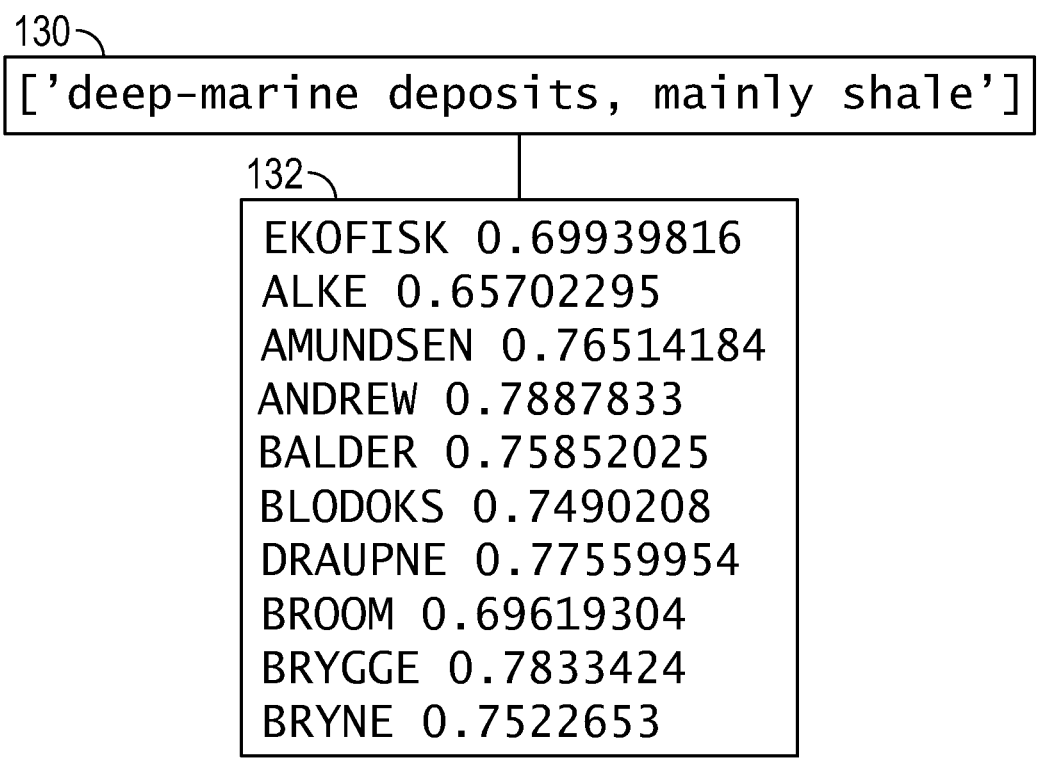
Figure 11:
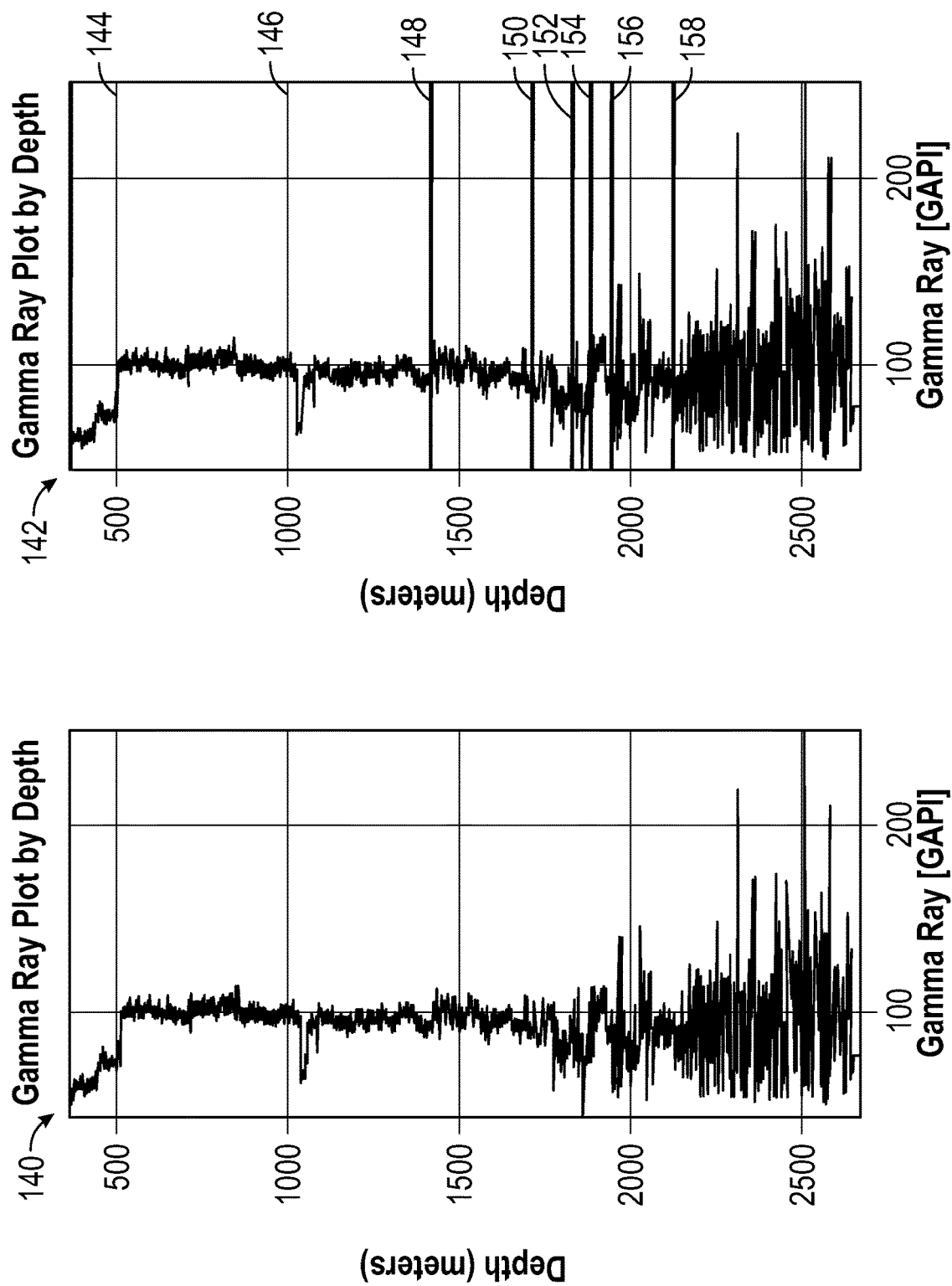

FIG. 8 an example of a drilling report, in accordance with an embodiment of the present disclosure;

FIG. 9 is an example of a lithostratigraphic chart, in accordance with an embodiment of the present disclosure;

FIG. 10 illustrates a second example of well analog output, in accordance with an embodiment of the present disclosure; and FIG. 11 shows a well log with identified sub-regions, in accordance with an embodiment of the present disclosure.

DETAILED CHARACTERIZATION

One or more specific embodiments of the present disclosure will be described below.

These described embodiments are examples of the presently disclosed techniques. Additionally, in an effort to provide a concise characterization of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In general, oil and gas exploration organizations may make certain oil and gas production decisions, such as determining where to drill, based on well logs and well reports. Well logs are generally a measurement versus depth and/or time of one or more physical quantities in and/or around a geological formation that includes a well. Well logs may be generated from a downhole tool that employs multiple well log measurements such as density, resistivity, photoelectric absorption properties, neutron spectroscopy, and the like. Certain techniques for informing the production decisions based on the well log data involve transforming the well log data into one or more visual representations (e.g., graphs and/or image data) that are presented as hard copies or on an electronic display, where each visual representation may depict data resulting from one of the well log measurements.

Well reports are generally an electronic (e.g., a text file, a portable document format (PDF)) or physical (e.g., a paper copy) that includes a written characterization (e.g., a text-based characterization) of geological and petrophysical properties (e.g., petrophysical characterization and petrophysical characterization) of one or more wells. In oil and gas exploration, geoscientists and engineers may compare new prospects and fields (e.g., oil fields and gas fields) with fields and surface exposures thought to be similar in depositional environment, depth, structural style, trap system, and/or reservoir character to guide predictions. At the well level, this information may be described in a drilling report, a geological report, and/or a completion report, as discussed in more detail with respect to FIG. 8. Certain techniques for using well reports and/or well logs to inform oil and gas exploration involve recording well logs and documenting well reports for one or multiple wells within a location. Accordingly, it may be expensive and time consuming to record and document for each multiple well to characterize the one or more wells and the location.

Accordingly, the present disclosure relates to a geological analog recommendation system that generates a well analog output that may be used to inform certain oil and gas production decisions, such as at the hydrocarbon exploration and production stages. In general, the disclosed techniques include receiving at least a portion of well log and/or well report for at least one well (e.g., a subset of wells) and determining one or more wells that are well analogs and/or one or more locations that are geological analogs to the well and/or location represented by the well log and/or well report. The techniques of the present disclosure may facilitate techniques for discovering and recommending well- and geological-analogs using a geological analog recommendation model. In some embodiments, the geological analog recommendation model may be configured to generate numerically encoded characterizations from well reports associated with a wellsite and/or encoded log measurement embeddings representing unique geological formation trends of the wellsite. Further, the geological analog recommendation model may be configured to generate a well analog output and/or geological analog output that may be used to inform oil and gas exploration decisions. In some embodiments, the well analog output may include a prediction or suggestion of words that may be used to describe a well or wellsite (e.g., provided as a selectable option as a display or automatically added to a well report) and/or provide recommendations (e.g., by displaying portions of text that may further characterize a wellsite that a user is writing about) to users generating well reports. In this way, the disclosed geological analog recommendation techniques may improve the discovery of wells and/or wellsites by identifying analog wells, wellsites, and/or locations that have similar petrophysical and geological characteristics.

Figure 1:
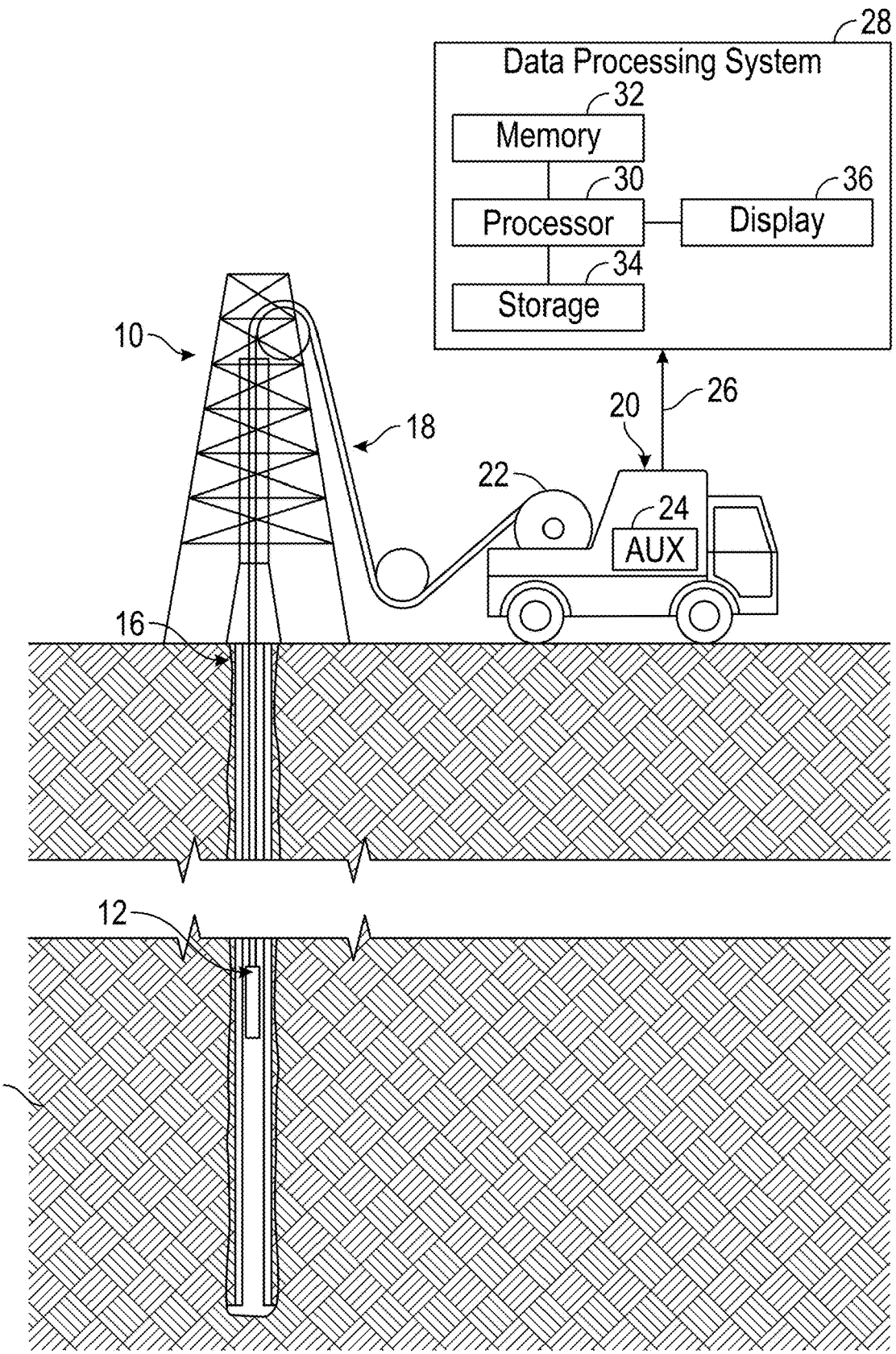
FIG. 1 is a schematic front elevation view of an embodiment of a well-logging system that may acquire measurements used to generate well logs and well reports, in accordance with an embodiment of the present disclosure.

With the foregoing in mind, FIG. 1 illustrates a well-logging system 10 that may be used to generate well logs, which may inform a well report, in accordance with the present disclosure. The well-logging system 10 may be used to convey a downhole tool 12 through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that obtains logging measurements through depths of the wellbore 16. For example, such logging measurements may include, but are not limited to, density, resistivity, photoelectric absorption properties, neutron spectroscopy, and the like.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the induction logging measurements 26.

Figure 2:
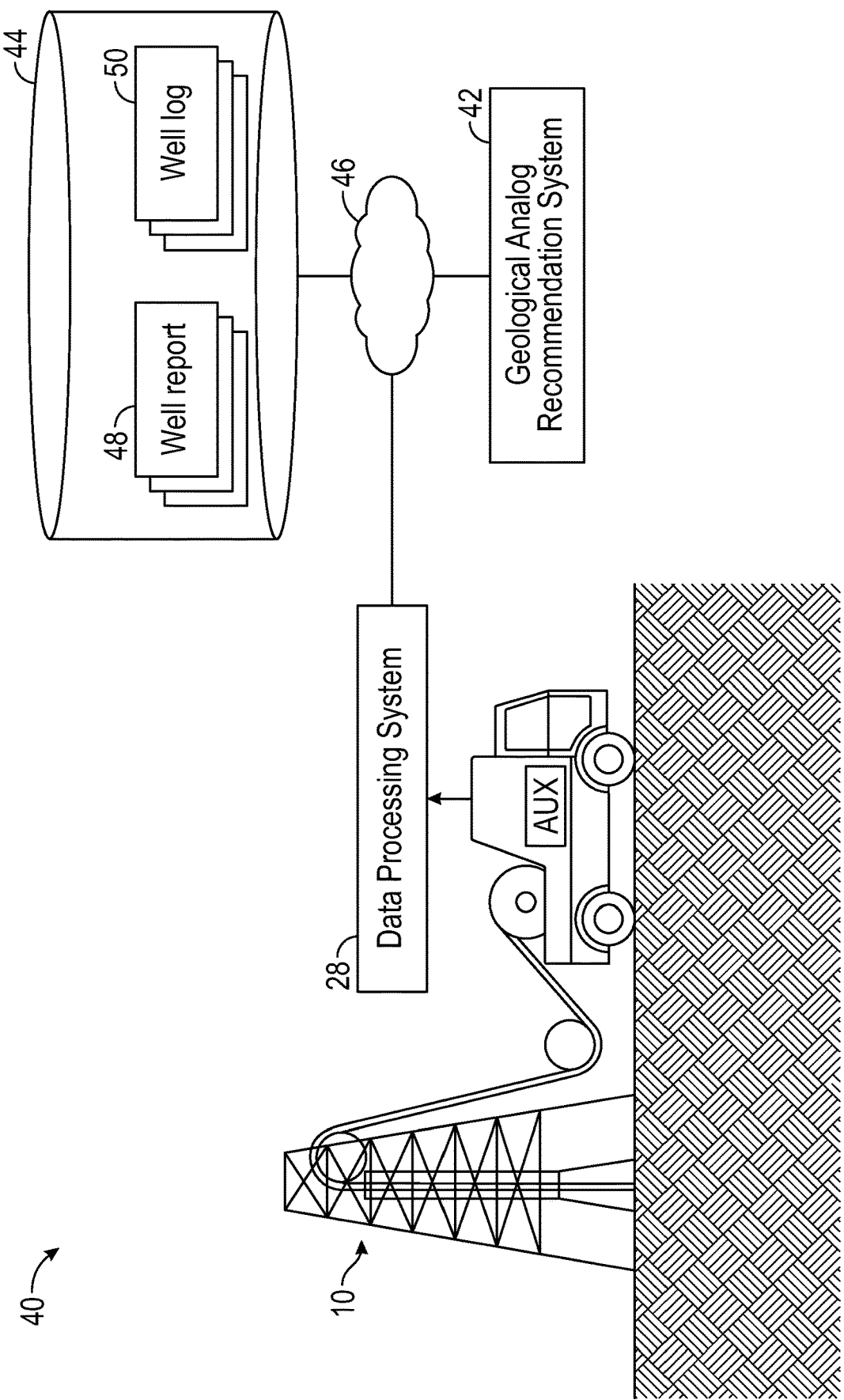
FIG. 2 is a schematic diagram of a system including a geological analog recommendation system, in accordance with an embodiment of the present disclosure.

With the foregoing in mind, FIG. 2 is a block diagram of a system 40 that includes a geological analog recommendation system 42, a database 44, a network 46, and the like. Further, as shown in the depicted embodiment, the geological analog recommendation system 42 is communicatively coupled to the data processing system 28 discussed above with respect to FIG. 1. In the depicted embodiment, the data processing system 28 is separate from the geological analog recommendation system 42, however, in some embodiments, the geological analog recommendation system 42 may be implemented on an electronic device that includes the data processing system 28. For example, both the data processing system 28 and the geological analog recommendation system 42 may be run on the same electronic device. In some embodiments, the geological analog recommendation system 42 may include an electronic device having a processor that, in some embodiments, performs one or more operations described herein. For example, the geological analog recommendation system 42 may include electronic devices such as a personal computer, laptop computer, tablet computer, smart phone, and so forth. The geological analog recommendation system 42 includes instructions executable by the processor to generate a geological analog recommendation model, determine analog wellsites based on an input (e.g., including a text-based characterization of a well), and generate updated well reports (e.g., the updated well reports include an updated characterization of the well). Additional details with regard to example components that may be part of the geological analog recommendation system 42 are described below with reference to FIG. 2.

As illustrated, the database 44 may store multiple well reports 48 and well logs 50. As discussed herein, the well reports (e.g., geological reports, petrophysical reports, mud reports, drilling reports) include text-based characterization of a wellsite and may be generated by a user (e.g., an operator, scientist, engineer, or otherwise, associated with a wellsite). The text-based characterization may include one or more words describing a wellsite. For example, the text-based characterization may include a geological structure characterization, a depth characterization, a lithological characterization, a depositional environment characterization, a well measurement characterization, and the like.

In general operation, the geological analog recommendation system 42 may utilize well reports 48 and well logs 50 (e.g., stored in the database 44 or a suitable memory/storage) to perform operations discussed herein. That is, the geological analog recommendation system 42 may convert one or more text-based characterizations (e.g., one or more words, numbers, and the like) within a well report and/or well log to generate a numerical representation that represents properties of a location associated with the well report. For example, the geological analog recommendation system 42 may utilize an embedding process to represent the text-based characterization as a vector. Accordingly, the vector may indicate a meaning of one or more text-based characterizations and/or a well report, and thus multiple vectors for multiple well reports may enable a user to compare a similarity, difference, and/or relevancy between multiple well reports.

In some embodiments, the geological analog recommendation system 42 may generate a geological analog recommendation model based on multiple numerical characterizations for multiple well reports and/or well logs associated with multiple locations. For example, the geological analog recommendation system 42 may generate a numerical representation using one or more selected text-based characterizations from each of the multiple well reports. The text-based characterizations may be selected based on user-defined criteria, as discussed in more detail herein. Accordingly, the geological analog recommendation system 42 may be configured to convert a well report to a numerical representation using one or more text-based characterization.

In some embodiments, the geological analog recommendation system 42 may generate electronic files, such as a text file, a well report, and/or a modified well report, based on an input, such as a well report that includes text. For example, the geological analog recommendation system 42 may generate a numerical representation of a first well report provided as input. As such, the geological analog recommendation system 42 may compare the numerical representation to one or more numerical representations associated with different wells and/or locations. If the match indicates that the well associated with the first well report (e.g., provided as the input) is similar (e.g., having a similar numerical representation, a dot product of the vectors being above a threshold, and the like) to a second well report associated with a different well and/or location, then the geological analog recommendation system 42 may use at least a portion of the second well report to modify (e.g., add words, remove words, and change words) the first well report. For example, the geological analog recommendation system 42 may add a portion of the second well report to the first well report to facilitate describing the well. As another example, the geological analog recommendation system 42 may display one or more portions of the second well report on a display of the geological analog recommendation system 42 that the user may select to add to the first well report.

In some embodiments, the geological analog recommendation system 42 may prompt a user to provide an input (e.g., an authorization) indicating whether or not to modify a well log report with text associated with one or more identified well analogs. For example, geological analog recommendation system 42 may output a control signal that causes a pop-up or notification to be displayed on a display of the geological analog recommendation system 42 or a similar computing device where a user is generating a well log report. In some embodiments, the pop-up or notification may depict one or more buttons for the user to select indicating whether or not to add additional text-based characterization that are originating from a well report associated with the one or more identified well analog.

Additionally or alternatively, the geological analog recommendation system 42 may automatically determine whether or not to automatically update and/or modify a well log report based on user-defined criteria and/or filter data, such as keywords indicating a text-based characterization of a first well associated with the well log report that are similar to a text-based characterization of a second well that the geological analog recommendation system 42 has identified as being analogous to the first well. In some embodiments, the user may use his or her prior knowledge of a geographic region associated with the first well. In some embodiments, the geological analog recommendation system 42 may automatically modify a well report to include one or more text-based characterization from another well report when the geological analog recommendation system 42 has identified a well as being analogous to the first well. For example, the geological analog recommendation system 42 may compute a similarity index based on a numerical representation of a well (e.g., a vector representation). When the similarity index is above a threshold, the geological analog recommendation system 42 may automatically modify the well report.

In some embodiments, the geological analog recommendation system 42 may prompt the user to provide an input indicating the user-defined criteria. For example, before generating a well analog recommendation model, the geological analog recommendation system 42 has identified as being analogous to the first well may prompt the user to provide an input indicating keywords to determine words within a file to use to determine the numerical representation. That is, the keywords may include general language terminology and/or domain specific terminology, which may enable the geological analog recommendation system 42 to identify words that may include a text-based characterization of the well, such as a geological structure characterization, a depth characterization, a lithological characterization, a depositional environment characterization, a well measurement characterization, and the like. In particular, when a well report includes a data type, or the like that correlates to or matches the keywords provided by the user, the geological analog recommendation system 42 may calculate a numerical representation using the words that match the keywords.

In general, the numerical representation may include one or more numbers that indicate a similarity or difference between well reports and/or well logs. For example, the numerical representation may include a number between 0 and 1 that indicates how similar the numerical representation of a first well report is to a second well report. In some embodiments, the geological analog recommendation system 42 may generate a similarity index or comparison between multiple well reports, as discussed with respect to FIG. 6.

Figure 3:
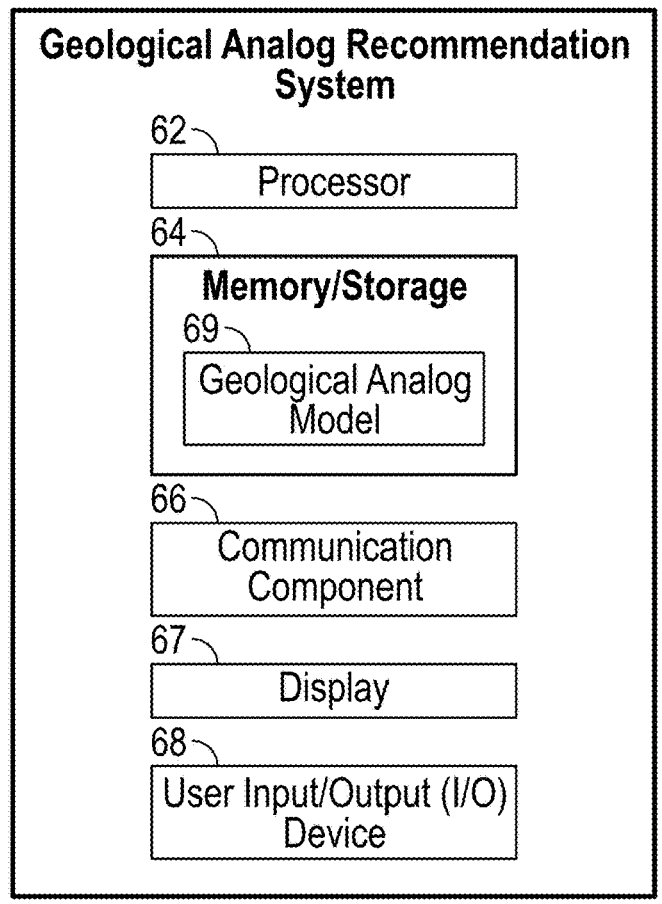
FIG. 3 is a block diagram of an example of the geological analog recommendation system of FIG. 2, in accordance with an embodiment of the present disclosure.

To perform one or more operations described herein, the geological analog recommendation system 42 may include various types of components that may assist the geological analog recommendation system 42 in performing the operations described below. For example, as shown in FIG. 3, the geological analog recommendation system 42 may include a processor 62, memory/storage 64, a communication component 66, a display 67, input/output (I/O) port 68, and the like, in accordance with embodiments described herein.

The processor 62 may be any type of computer processor or microprocessor capable of executing computer-executable code. The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array) or an ASIC (application specific integrated circuit). Processors suitable for the execution of a computer program include, by way of example, both general and special purpose microprocessors, and/or processor(s) of any appropriate kind of digital computer.

The memory and the storage 64 may be any suitable articles of manufacture that store processor-executable code, data, or the like. These articles of manufacture may include non-transitory computer-readable media (e.g., any suitable form of memory or storage) that may store the processor-executable code used by the processor 62 to perform the presently disclosed techniques. As used herein, applications may include any suitable computer software or program that may be installed onto the geological analog recommendation system 42 and executed by the processor 62. It should be noted that non-transitory merely indicates that the media is tangible and not a signal. As illustrated, the memory and/or the storage 64 may store the geological analog recommendation model 69.

The communication component 66 may be a wireless or wired communication component that may facilitate communication between the geological analog recommendation system 42, and various other computing systems via the network 46, the Internet, or the like. The display 36 may depict visualizations associated with software or executable code being processed by the processor 62. The display 67 may be any suitable type of display, such as a liquid crystal display (LCD), plasma display, or an organic light emitting diode (OLED) display, a projected display, and the like. Additionally, in one embodiment, the display 36 may be provided in conjunction with a touch-sensitive mechanism or touch display (e.g., a touch screen) that may function as part of a control interface for the geological analog recommendation system 42 and be capable of receiving inputs from a user (e.g., the property owner). The I/O ports 68 may be interfaces that may couple to other peripheral components such as input devices (e.g., keyboard, mouse), the input/output (I/O) devices ports 68, and the like. For example, to provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Figure 4:
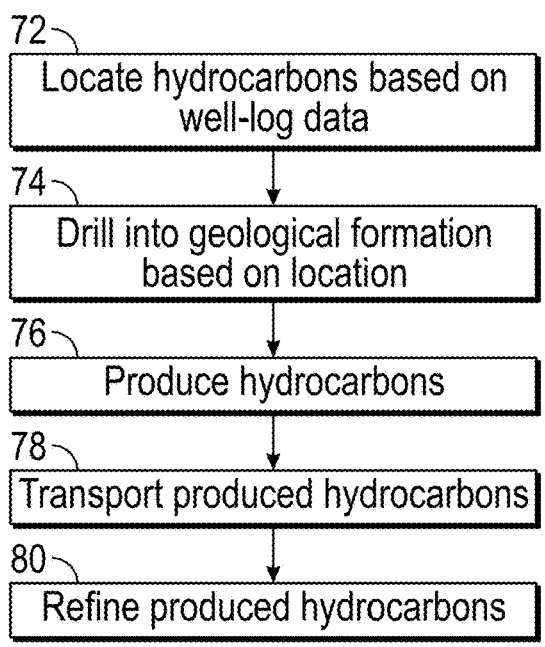
FIG. 4 illustrates a flow chart of various processes that may be performed based on analysis of well logs, in accordance with an embodiment of the present disclosure.

FIG. 4 illustrates a method 70 of various processes that may be performed based on analysis of well reports and/or well logs, in accordance with aspects of the present disclosure. A location of hydrocarbon deposits within a geological formation may be identified (block 72) based on well-log data. In some embodiments, the well-log data may be analyzed to generate a map or profile that illustrates regions of interest with the geological formation.

Based on the identified locations and properties of the hydrocarbon deposits, certain positions or parts of the geological formation 14 may be explored (block 74). That is, hydrocarbon exploration organizations may use the locations of the hydrocarbon deposits to determine locations at the surface of the geological formation 14 to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 76) via natural flowing wells, artificial lift wells, and the like. Further, the produced hydrocarbons may be transported (block 78) to refineries and the like via transport vehicles, pipelines, and the like. Further still, the produced hydrocarbons may be processed (block 80) according to various refining procedures to develop different products using the hydrocarbons.

It should be noted that the processes discussed with regard to the method 70 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Figure 5:
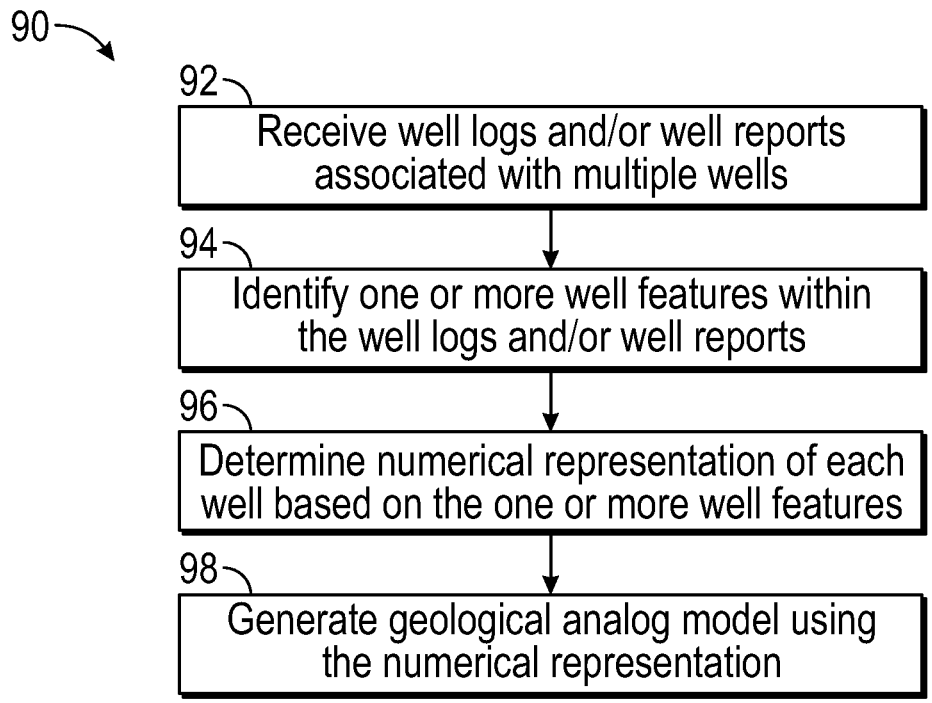
FIG. 5 illustrates a flow chart for generating a geological analog recommendation model based on well logs and log reports, in accordance with an embodiment of the present disclosure.

FIG. 5 illustrates an example process 90 that may be employed by the geological analog recommendation system 42 to identify data to generate a geological analog recommendation model (e.g., the geological analog recommendation model 69), in accordance with embodiments described herein. The steps of the process 90 may be stored in the memory and/or the storage 64. Before proceeding, it should be noted that the process 90 is described as being performed by the processor 62 of the geological analog recommendation system 42, but the process 90 may be performed by other suitable computing devices. Although described in a particular order, which represents a particular embodiment, it should be noted that the process 90 may be performed in any suitable order. Additionally, embodiments of the process 90 may omit process blocks and/or include additional process blocks.

As illustrated in block 92, the processor 62 receives well logs and well reports associated with multiple wells. In general, and as discussed herein, the well reports include a text-based characterization of geological and/or petrophysical properties of a wellsite. For example, the text-based characterization may include multiple words that indicate a property.

At block 94, the processor identifies one or more well features within the well logs and/or well reports. In some embodiments, the processor 62 may identify the one or more well features based on keywords indicating the well features. For example, the keywords may be user-defined criteria indicating multiple words that are a text-based characterization associated with geological and/or petrophysical properties of the wellsite. For example, the user may use his or her prior knowledge of geological and/or petrophysical properties of the wellsite for the keywords.

At block 96, the processor may determine a numerical representation of each well based on the one or more well features. For example, the processor 62 may determine the numerical representation using an embeddings process. In an embodiment, a workflow based on embeddings created through different deep learning methods; both targeting analog generation is disclosed. The method includes using natural language processing algorithms to create numerical vectors representations from expert text characterizations written for each well that can be used to calculate similarities between wells and geological formations those wells penetrate. Wells with similar geological and petrophysical properties are expected to be described with similar words, sentences, even similar paragraphs and have similar measurement trends in the logs. With that expectation, wells with similar embedding vectors from one part of the world can be recommended as well-analogs or geological analogs to newly drilled wells for exploration in other parts of the world where geological and petrophysical similarities exist. Expert characterizations and interpretations can come from geological reports, petrophysical reports, mud reports, drilling reports or any other specific sub-domain in oil and gas exploration workflows and various different embedding vectors can be generated for different domains, i.e. geological embedding, petrophysical embedding, drilling embedding etc., which can be used together or separately to recommend well analogs to the user.

Deep neural network based contextualized embeddings can capture semantics and syntactic signature of sentences, paragraphs or documents, achieving a certain level of understanding of the domain specific knowledge and encode them in numerical representations. The reports produced at well level include geological and petrophysical knowledge of the earth formation the well penetrates and captured numerical embedding representations which can be utilized as analogs for other wells around the world. Searching for geological formation analogs during the exploration workflow is a key step for any exploration geologist and through this method one can find similar wells and geological formations with similar properties recommended by these embeddings created from past written reports.

In an embodiment, a further method of analog generation utilizes the log measurements to capture the trends and encode them as numerical representations through training of recurrent neural network (RNN) based deep learning models. RNN models can work with varying length sequential inputs, i.e. logs, to capture the trends in the data. As RNN processes the data, internal states of the model can encode a representation of the sequential data capturing long range dependencies that may exist in the data. Once various logs for different formations are used to train RNNs, different internal representations can be generated per well or per geological formation which can then be compared to newly drilled well logs to recommend analogs. At block 98, the processor 62 generates a geological analog recommendation model using the numerical representations.

In this manner, the process 90 may enable the geological analog recommendation system 42 to generate a geological analog recommendation model based on well reports 48 and well logs 50. As discussed herein, the geological analog recommendation model may enable more efficient generation of well reports, thereby facilitating oil and gas production.

Figure 6:
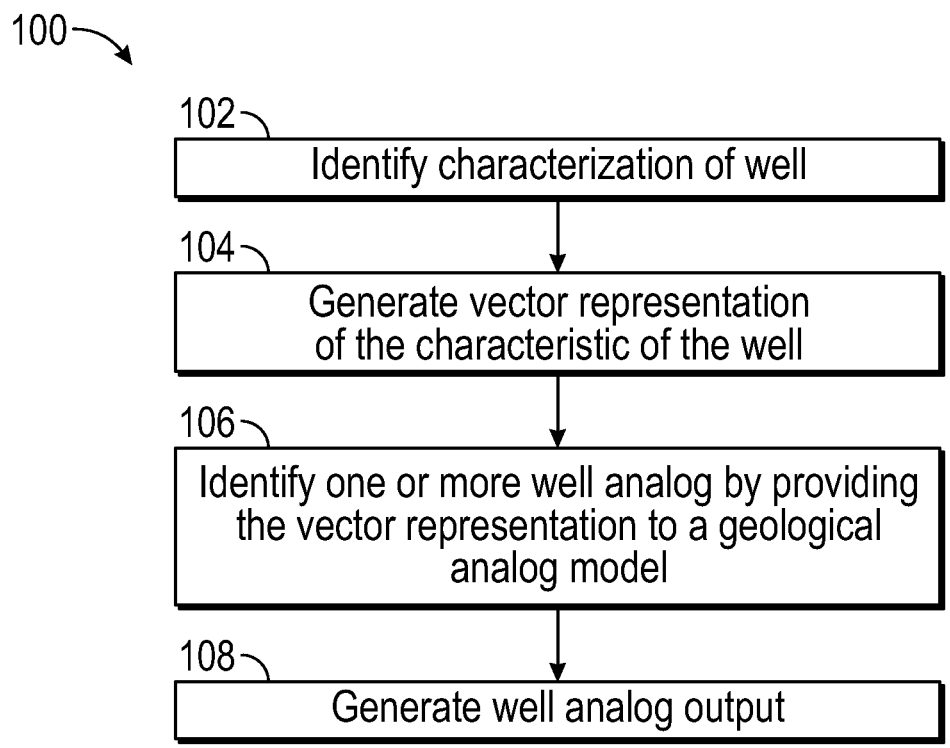
FIG. 6 illustrates a flow chart of various processes that may be performed based on identified analog wells, in accordance with an embodiment of the present disclosure.

FIG. 6 illustrates an example process 100 that may be employed by the geological analog recommendation system 42 to identify data to generate a geological analog recommendation model (e.g., the geological analog recommendation model 69), in accordance with embodiments described herein. The steps of the process 100 may be stored in the memory and/or the storage 64. Before proceeding, it should be noted that the process 100 is described as being performed by the processor 62 of the geological analog recommendation system 42, but the process 90 may be performed by other suitable computing devices. Although described in a particular order, which represents a particular embodiment, it should be noted that the process 100 may be performed in any suitable order. Additionally, embodiments of the process 90 may omit process blocks and/or include additional process blocks.

As illustrated in block 102, the processor 62 may identify a characterization of a well. For example, the characterization may include a text-based characterization. As another non-limiting example, the characterization may include a stratification unit, as discussed in more detail with respect to FIG. 8. In some embodiments, the characterization may be provided as an input, such as an input query or search query, as discussed with respect to FIG. 10. At block 104, the processor 62 may generate a vector representation of the characteristic of the well. In some embodiments, the vector may represent the entire well report. It should be noted that the vector may indicate a general meaning of one or more text-based characterizations. As such, the geological analog recommendation system 42 may be configured to generate well analog outputs associated with a general meaning of the text-based characterization (e.g., based on synonyms of certain words, similar terms to describe types of geological formations, and the like). At block 106, the processor 62 may identify one or more analog wells by providing the vector representation to a geological analog model. For example, the processor 62 may identify analog wells having a vector representation that is similar to the vector representation generated at block 104, as discussed in more detail with respect to FIG. 10. At block 108, the processor 62 may generate a well analog output, which may include a well report, a modified well report, one or more recommended text-based characterizations to include in a well report, and the like. Although described as a well analog output, the well analog output may also include a geological analog output that indicates a geological formation that is similar to the location associated with the well report.

In this manner, the process 100 may enable the geological analog recommendation system 42 to generate a geological analog recommendation model based on well reports 48 and well logs 50.

Figure 7:
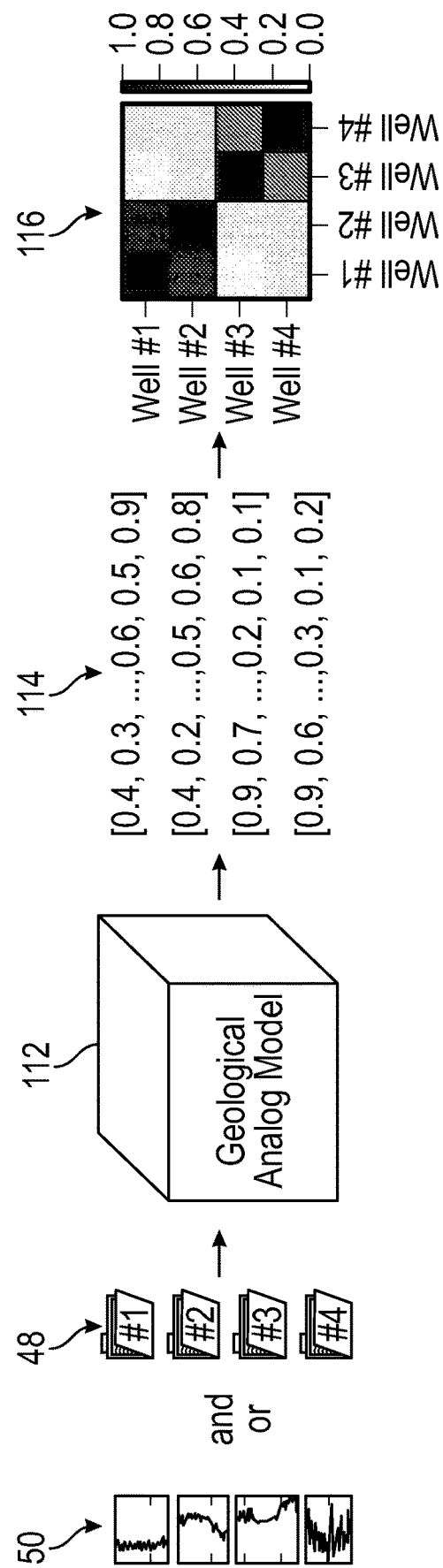
FIG. 7 is a schematic diagram illustrating a first example of a well analog output, in accordance with an embodiment of the present disclosure.

FIG. 7 depicts a well analog recommendation 116 generated using well logs 50 and well reports 48. The well reports 48 and/or log measurements (e.g., the well logs 50) for each well may encoded through the deep learning based "Embedding Encoder" model 112 (e.g., the geological analog recommendation model 69), where expert characterizations as text may be converted into numerical representations 114 at various levels of granularity, such as at the sentence, paragraph and document level. In some instances, the numerical representations 114 may be compared to user defined sentences or queries, as discussed in more detail with respect to FIG. 10. In the depicted embodiment, the well analog recommendation 116 illustrates a similarity index map. That is, the generally darker portions indicate that two wells are more similar. For example, 'Well #1' is shown as being more similar to 'Well #2' than to 'Well #3' and 'Well #4'. In some embodiments, varying length sequential log data can be encoded through recurrent neural network-based models to be compared with the user query-embeddings and embeddings with high similarity scores are recommended as analogs and displayed on a GIS system to visualize the clustering of highly similar wells or geological formations.

FIG. 8 is an example of a drilling report (e.g., a well report 48) from a well in an NPD database. In the depicted embodiment, multiple text-based characterization of a wellsite associated with the well report 48 are shown. The text-based characterization includes a geological structure characterization 120, depth characterizations 122, well measurement characterizations 124, and depositional environment characterizations 126. In the depicted embodiment, the well measurement characterizations 124a, 124b, and 124c are porosity measurements. It should be noted that this example is non-limiting and in other embodiments, the well measurement characterizations may include one or more multiple types of measurements (e.g., resistivity, gamma-ray, and the like).

Another source of information that may be used to define a well analog and/or geological analog is a type of stratigraphic formation or group, which may be indicated by a string within the well report. The lithostratigraphic chart 128 of the Norwegian North Sea is represented in FIG. 9. Searching for specific geological characterizations could relate to specific stratigraphic units in different basins. For example, the geological analog recommendation system 42 may determine a stratigraphic unit associated with a well report or a text-based characterization of a well associated with the well report. As such, the well analog output may include one or more text-based characterizations associated with the stratification units.

FIG. 9 is a lithostratigraphic chart of the Norwegian North Sea. In some embodiments, the users can provide the characterization of the geology or petrophysical property (e.g., a text-based characterization) that the user would like to search for, and this characterization is encoded in a numerical representation and is compared to the pre-encoded well-vectors. Similar characterizations will result in high similarity scores and can be recommended to user as analogs as illustrated in FIG. 10, which shows an input query 130 that includes text-based characterizations. In this example, user queries the sentence of the "deep-marine deposits, mainly shale", which is encoded into a numerical vector using the open-sourced version of a Universal Sentence Encoder model and compared to the pre-computed well-vectors. In the depicted embodiment, a similarity index 132 is shown that includes a listing of multiple formations with similar properties. Each formation is associated with a number (e.g., a similarity score) between 0 and 1, with 1 indicating that the formation represented by the input query 130 is more similar to one of the formations. However, it should be understood that the similarity index is not limited to a number between 0 and 1. At least in some instances, the geological analog recommendation system 42 may output formations with a similarity score above a threshold. For example, similarity index 132 may include formations and associated similarity scores that are above a threshold (e.g., greater than 0.6, greater than, greater than 0.8). Stratigraphic formations with high similarities, like Brygge and Draupne formations returns a high similarity score, whereas dissimilar formations like Alke and Ekofish return low similarity scores. In this way, a query sentence (e.g., the input query 130) is compared to the vectors generated from the text-based characterizations of formations including lithology and depositional environment information.

FIG. 11 is an illustrative figure from NPD where a Gamma Ray log 140 of a well is plotted on the left-hand side and identified well tops shown in 142 with lines 144, 146, 148, 150, 152, 154, 156, and 158. Each sub-region between well tops represent different formations and each section is encoded into numerical vectors to be used as analogs to newly drilled well logs.

In the depicted embodiment, defined well tops separate the main trends/patterns in the Gamma Ray log. The trends may be used to determine analogous formation or depositional environments from the logs encoding for each interval defined between two well tops.

As completed by geologists, the well tops are determined by a change in the log values or a change in the log trends. To infer the formation or depositional environments label between well tops of a newly drilled exploration well, a Recurrent Neural Network may be implemented that may capture and encode the trend of the logs (lithology, petrophysics, and sedimentology logs). In an embodiment, methods of the subject disclosure are used to encode either text data or log data respectively in order to find geological- or well-analogs. Although, in one embodiment, it may be desirable to use them separately, one may combine them through their embedding space to achieve zero-shot learning for unseen geological formations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Accordingly, the present disclosure relates to a geological analog recommendation system that facilitates the identification of geological and petrophysical properties of a geological formation including a wellsite. The geological analog recommendation system generally generates a well analog output, which may include a well report, a modified well report, a similarity index, an ordered listing of one or more wells, well sites, or locations having similar geological and petrophysical properties. In some embodiments, the geological analog recommendation system may generate a model using multiple well reports and/or well logs. Accordingly, the geological analog recommendation system may implement the model using a search query, such as an input string (e.g., a text-based characterization). As such, the geological analog recommendations system may generate and output a well analog output that may facilitate generating a well report and/or provide recommendations to a user (e.g., a well operator and the like) of certain actions to perform as discussed herein. Moreover, the disclosed techniques may be at least partially automated. In this way, the embodiments in accordance with the present disclosure improve oil and gas operations by improving techniques for discovering well sites by reducing an amount of input provided by a user, whether for generating a well report or determining actions to take with respect to a well.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
receiving a text-based characterization of a well, wherein the text-based characterization of the well comprises one or more words describing a geological characterization of the well, a petrophysical characterization of the well, and at least one of a depth characterization of the well, a depositional environment characterization of the well, or a well measurement characterization of the well;
generating a vector representation of the text-based characterization of the well based on the geological characterization, the petrophysical characterization, and the at least one of the depth characterization, the depositional environment characterization, or the well measurement characterization;
identifying one or more analog wells using the vector representation;
prompting, via a user interface, a user to provide an input indicating whether to modify a characterization of the well with text associated with the one or more analog wells;
in response to receiving a user input that indicates to modify the characterization of the well based on the one or more analog wells, generating an updated characterization of the well based on the text associated with the one or more analog wells; and
outputting the updated characterization of the well.

2. The method of claim 1, wherein the vector representation of the text-based characterization is generated using an embeddings process.

3. The method of claim 1, wherein identifying comprises:
comparing the vector representation to one or more vector representations associated with a plurality of wells; and
wherein the identified one or more analog wells comprise a subset of the plurality of the wells with a similarity index above a threshold.

4. The method of claim 1, wherein generating the vector representation comprises inputting the vector representation to a geological analog recommendation model configured to output the vector representation.

5. The method of claim 1, where in the text-based characterization comprises a plurality of words that describe the geological characterization, the petrophysical characterization, or both.

6. The method of claim 1, wherein the updated characterization of the well comprises an additional text-based characterization of the well.

7. The method of claim 1, wherein the text-based characterization further comprises a geological structure characterization or a lithological characterization.

8. A method, comprising:
receiving a plurality of well logs and a plurality of well reports, or both, associated with a plurality of wellsites, wherein the plurality of well reports comprise text-based characterizations that include words describing at least one of a depth characterization, a depositional environment characterization, or a well measurement characterization;
prompting, via a user interface, a user to provide user-defined criteria that indicate one or more keywords;
identifying one or more well features from the plurality of well logs and the plurality of well reports based in part on the one or more keywords and the words describing the at least one of the depth characterization, the depositional environment characterization, or the well measurement characterization;
determining a numerical representation of each well based on the identified one or more well features;
generating a geological analog recommendation model using the numerical representation of each well;
providing a portion of a well report associated with a wellsite separate from the plurality of wellsites into the geological analog recommendation model;
receiving, as an output of the geological analog recommendation model, an updated well report associated with the wellsite separate from the plurality of wellsites, wherein the updated well report was generated by modifying the portion of the well report based on at least one analog wellsite included in the plurality of wellsites; and outputting, via a display, the updated well report.

9. The method of claim 8, comprising identifying the one or more well features from the plurality of well reports, wherein identifying the one or more well features comprises pre-processing the plurality of well reports to remove words that do not describe the plurality of wellsites and to generate a pre-processed well report.

10. The method of claim 8, comprising determining the numerical representation of each well using a neural network.

11. The method of claim 8, wherein the text-based characterization further comprises one or more of a geological structure characterization or a lithological characterization.

12. The method of claim 8, comprising:
inputting a search query into the geological analog recommendation model, wherein the search query comprises a text-based characterization associated with a second wellsite separate from the plurality of wellsites; and receiving, as an output of the geological analog recommendation model, a well analog output indicating a similarity between the second wellsite and at least one wellsite of the plurality of wellsites.

13. The method of claim 12, wherein the well analog output comprises a well similarity index.

14. The method of claim 12, wherein the well analog output comprises an additional text-based characterization.

15. The method of claim 8, wherein the numerical representation comprises a vector representation of the identified one or more well features; and the method comprising generating the numerical representation using an embeddings process.

16. A system, comprising
a display;
one or more processors coupled to the display; and
one or more memory devices storing machine-executable instructions that, when executed by the one or more processors, cause the one or more processors to:
receive a text-based characterization of a well, wherein the text-based characterization of the well comprises one or more words describing a geological characterization of the well, a petrophysical characterization of the well, and at least one of a depth characterization of the well, a depositional environmental characterization of the well, or a well measurement characterization of the well;

generate a vector representation of the text-based characterization of the well based on the geological characterization, the petrophysical characterization, and the at least one of the depth characterization, the depositional environmental characterization, or the well measurement characterization;

identify an analog well using the vector representation;

prompt a user to provide an input indicating whether to modify the text-based characterization of the well with text included in a text-based characterization of the analog well;

in response to receiving a user input that indicates to modify the text-based characterization of the well with the text included in the text-based characterization of the analog well, modify the text-based characterization of the well with the text included in the text-based characterization of the analog well;

generate a well analog output comprising a well report based on the modified text-based characterization of the well; and display the well analog output using the display.

17. The system of claim 16, wherein the well report comprises a drilling report, a geological report, a completion report, or any combination thereof.

18. The system of claim 16, wherein the instructions, when executed by the one or more processors, cause the one or more processors to generate the vector representation based on numerically encoded expert characterizations from well reports and/or encoded log measurement embeddings representing unique geological formation trends.

19. The system of claim 16, wherein the well analog output comprises an additional text-based characterization.

20. The system of claim 16, wherein the text-based characterization further comprises a geological structure characterization or a lithological characterization.

* * * * *